United States Patent Office 3,269,657
Patented August 30, 1966

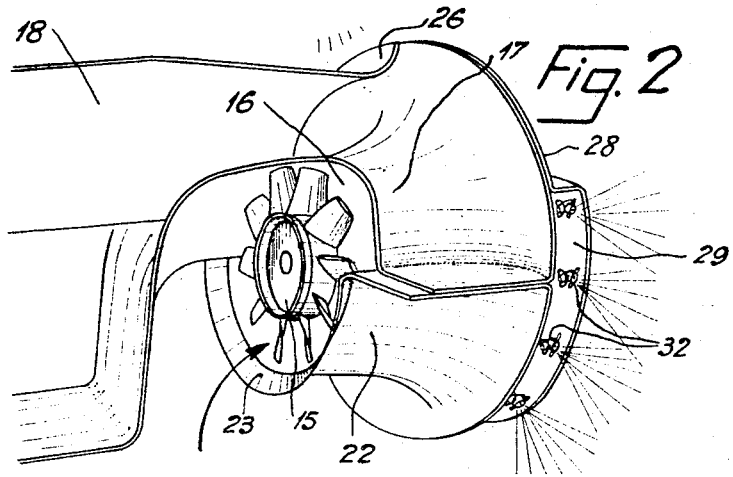
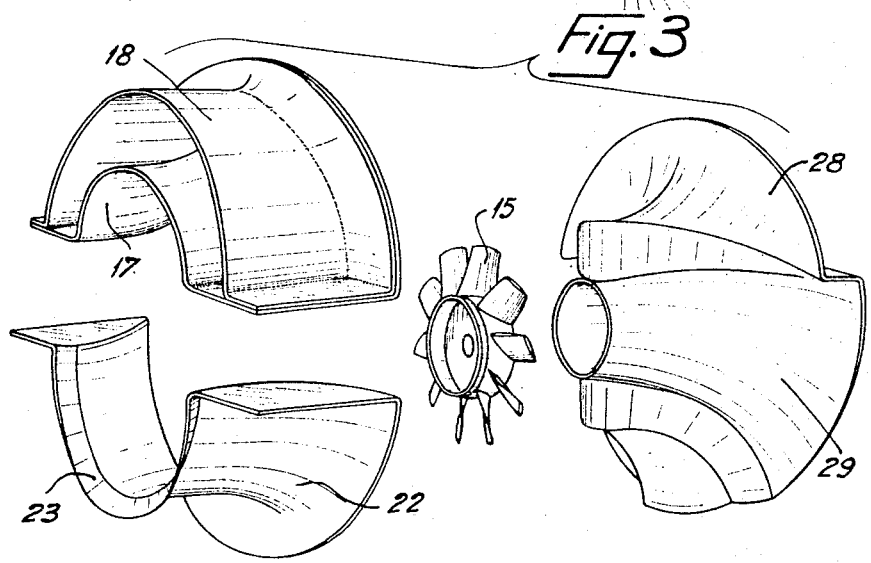
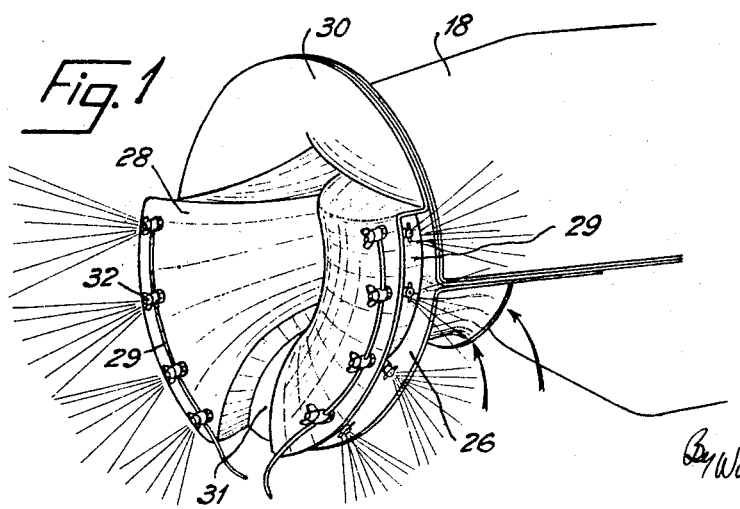

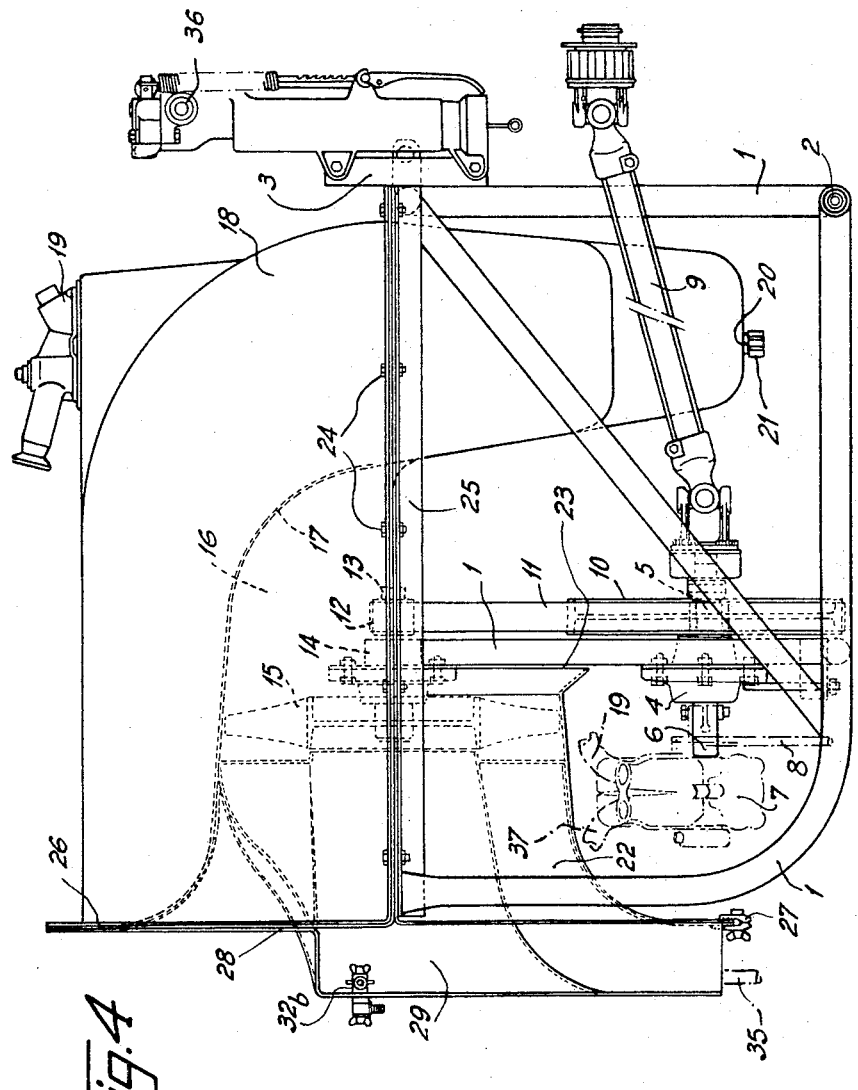

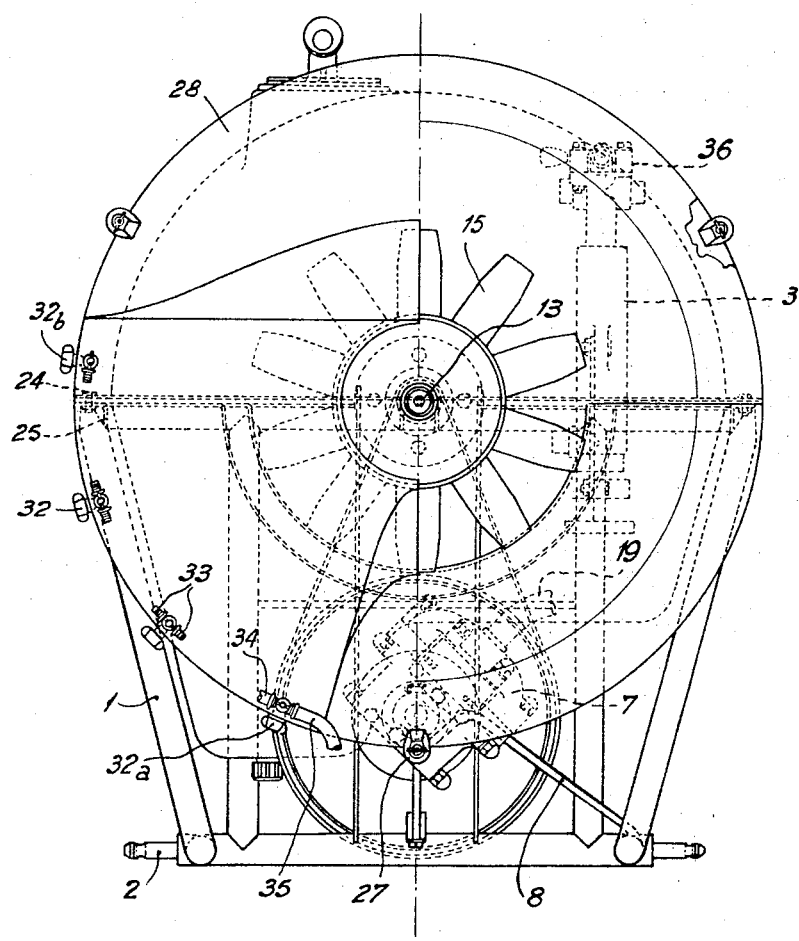

3,269,657
SPRAYER ASSEMBLY FOR THE SPRAY TREATMENT OF CROPS AND THE LIKE
Vincent P. M. Ballu, Épernay, Marne, France, assignor to Societe Pour la Diffusion de Techniques Nouvelles et de Machinisme Agricole par Abreviation "Tecnoma," Épernay, Marne, France, a company of France
Filed July 14, 1964, Ser. No. 382,542
Claims priority, application France, July 15, 1963, 941,477
3 Claims. (Cl. 239—77)

This invention relates to sprayer assemblies of the type wherein treating liquid is delivered into an outlet nozzle and an air-stream is discharged through said nozzle by means of a blower unit so as to carry along the sprayed cloud and to increase its power of penetration into the foliage of crops to be treated. For use in sprayer systems of this type various forms of blower units have been proposed supplied with air from helicoidal or centrifugal fans; however the assemblies so far constructed all have an inconvenience in that they are not capable of rapid adaptation to the various types of farming corps that may require treatment.

The present invention has as an object to provide a sprayer assembly of the kind above referred to so constructed and arranged that it will be capable of receiving deflector or diffusor outlet nozzles of different shapes, adapted both for ready angular adjustment about their center axis, and for easy removal and replacement with a different nozzle, without expensive modifications in the assembly and without complicated handling operations.

With this object in view the improved sprayer assembly comprises a wind tunnel preferably defined in part by a wall of the tank containing the treating liquid, and which tunnel terminates in a flanged outlet funnel adapted to have attached thereto, e.g. through simple clamping elements, a diffusor unit provided with one or more side outlets and spray nozzles discharging into said outlets.

A set of lightweight and efficient diffusor units can easily be provided which will be selectively fittable to the flanged funnel outlet and will fulfill the requirements of a wide range of different instances of use, and the mounting and angular adjustment of such diffusor units will be easily and quickly effected.

The ensuing description made with reference to the accompanying drawings given by way of example but not of limitations will provide a clear understanding of the manner in which the invention may be performed and of the novel features thereof.

FIGURE 1 is a partial perspective view, largely schematic, of the rear part of a sprayer assembly according to the invention.

FIGURE 2 is a similar view from the front with parts broken away.

FIGURE 3 is an exploded perspective view of certain components of the sprayer assembly.

FIGURE 4 is an elevational view of the complete sprayer assembly.

FIGURE 5 is a corresponding end view with parts broken away.

In the illustrated embodiment the sprayer assembly comprises a frame 1 (FIGURES 4 and 5), preferably of tubular skeleton construction, and provided with bottom supporting trunnions 2 and an adjustable coupling or hitching device 3 for attachment to a tractor not shown.

The frame 1 is provided in its lower part with a bearing 4 serving to mount a main shaft 5 coupled at one end to the shaft 6 of a pump 7 supported by its shafting and braced by a strut 8, while at its other end the main shaft 5 is coupled to one end of a Cardan transmission 9 adapted to be coupled at its other end with a power take off of the tractor as shown.

Keyed on the main shaft 5 is a pulley 10 which drives through a drive belt 11 and a smaller-diameter pulley 12, a fan shaft 13 journaled in a bearing 14 supported in the frame 1, and mounting a fan unit 15.

The fan unit is positioned within a tunnel 16 having a flared or funnel-shaped outlet section and, as best seen in FIGURES 1 to 3, the upper wall surface of the tunnel is defined by the lower wall 17 of a liquid tank 18.

The tank 18 extends forward on both sides of the Cardan shafting 9 and is provided at its top with a filling and suction fitting 19 connected to the suction inlet of pump 7 and at its bottom with a drain outlet 20 provided with a screwed-on plug 21 (FIGURE 4).

The lower half of the wind tunnel is defined by a shell 2 which defines an air intake 23 forwardly of the fan 15 and is assembled to the tank 18 by way of bolts 24 (FIGURES 4 and 5) which also serve to mount the shell and tank on longitudinal angle members of the frame 1.

The outlet section of tunnel 16 is shaped to provide a flared funnel in the general form of a surface or revolution having a flange 26 which terminates in a plane normal to the axis of the tunnel. Said flange 26 is adapted to have a diffusor member 28, substantially equal in diameter to that of the flange, detachably secured to it as by way of screw-clamp members 27.

The diffusor member can have any one of a plurality of different shapes depending on the particular use to which the sprayer is to be put. In the illustrated example, the diffusor member 28 is formed with a pair of arcuate side outlets 29 each extending over about one third of its circumference, and intermediate flange portions 30 and 31 which are adapted to engage flat against the flange 26 of the outlet funnel of tunnel 16 when pressed thereagainst by the screw-clamps 27. The diffusor member used may include more than the two outlets shown, or a single outlet, and the arcuate extent of the outlet or outlets may be greater or less than that shown. The diffusor member, owing to its generally circular form and its detachable connection with the tunnel outlet funnel, as by means of the screw clamps shown, can easily and quickly be replaced by a different member, and more over its angular position about the tunnel axis can be easily and quickly altered, all as required by the particular spraying operations to be performed.

Mounted at spaced intervals along the arcuate extent of the outlet or outlets 29 are spray nozzles (or pipes) 32 having their outlets directed into the funnel outlet slot. In the instant example the spray nozzles 32 are provided with a pair of connector unions 33 which are connected as between adjacent spray nozzles through pipes 34 with the foremost spray nozzle 32a being connected through a pipe 35 with the outlet of a feed regulator unit 37 connected to the outlet of pump 7, while the lasts spray nozzle 32b of the series is provided with but a single connector 33. The spray nozzles 32 are angularly adjustable and are mounted radially as shown.

In operation, the spray nozzles 32 discharge liquid delivered thereto by pump 7 which draws liquid from tank 18 (by way of suction line 19) into the laterally directed airstream discharged by the fan 15 through the outlet slots 29 of the funnel. The resulting liquid spray is propelled by the airstream so as to have a high degree of penetration into the foliage of the farming crops being treated.

It will be understood that various modifications may be introduced into the form of embodiment shown and described without exceeding the scope of the invention.

What I claim is:

1. A sprayer assembly for the spray treatment of farming crops and the like, which comprises in combination a frame; a tank for treating-liquid supported on the frame; means supported on the frame defining a tunnel in the general form of a surface of revolution having a flanged funnel-like outlet section; air blower means supported from said frame and mounted in said tunnel for discharging an airstream therethrough and out of said outlet section; and a diffusor member connectable to said tunnel outlet section, said diffusor member comprising: a flange engageable with the flange of said outlet section in any one of a range of angular positions with respect thereto about the axis of revolution of said tunnel; means engageable with said flanges for securing the diffusor member in a selected angular position; means defining arcuate slot-like lateral outlet means from said diffusor member for discharging said airstream; and spray nozzles supported from said diffusor member including means connecting the nozzles with said tank to feed liquid to said nozzles, said nozzles being directed to discharge liquid into the airstream issuing from said diffusor outlet means, and said tunnel defining means comprises an upper part-circumferential wall section and a lower part-circumferential wall section and said upper wall section constitutes part of the under wall of said liquid tank.

2. A sprayer assembly for the spray treatment of farming crops and the like, which comprises in combination a frame; a tank for treating liquid supported on the frame; means supported on the frame defining a tunnel in the general form of a surface of revolution having a flanged funnel-like outlet section; air blower means supported from said frame and mounted in said tunnel for discharging an airstream therethrough and out of said outlet section; and a diffusor member connectable to said tunnel outlet section, said diffusor member comprising: a flange engageable with the flange of said outlet section in any one of a range of angular positions with respect thereto about the axis of revolution of said tunnel; means engageable with said flanges for securing the diffusor member in a selected angular position; means defining arcuate slot-like lateral outlet means from said diffusor member for discharging said airstream; and spray nozzles supported from said diffusor member including means connecting the nozzles with said tank to feed liquid to said nozzles, said nozzles being directed to discharge liquid into the airstream issuing from said diffusor outlet means, said tunnel defining means comprising an upper part-circumferential wall section and a lower part-circumferential wall section which together participate in defining a substantially continuous circumferential tunnel wall, said blower means comprising a fan rotatably supported between said wall sections coaxially with said circumferential wall, said lower wall section being formed with air intake aperture means therein adjacent an intake side of said fan, and said upper wall section being coextensive with part of the under wall of said liquid tank.

3. The sprayer assembly defined in claim 2, wherein said means for securing the diffusor member comprises a plurality of clamp members removably engageable around said flanges to permit of altering the angular position of said diffusor member about said axis and replacement of said diffusor member by a different diffusor member.

References Cited by the Examiner
UNITED STATES PATENTS

| | | | |
|---|---|---|---|
| 2,592,427 | 4/1952 | Keesling | 239—77 |
| 2,620,230 | 12/1952 | Hait | 239—78 |
| 2,661,242 | 12/1953 | Kurzbin | 239—77 |
| 2,978,185 | 4/1961 | Pearch | 239—77 |
| 3,138,329 | 6/1964 | Swanson | 239—77 |
| 3,216,664 | 11/1965 | Wolford et al. | 239—77 |
| 3,227,376 | 1/1966 | Rittenhouse | 239—78 |

M. HENSON WOOD, JR., *Primary Examiner.*

V. C. WILKS, *Assistant Examiner.*